(12) United States Patent
Hatsuse et al.

(10) Patent No.: US 11,171,576 B2
(45) Date of Patent: Nov. 9, 2021

(54) POWER CONVERSION DEVICE AND SYSTEM USING THE SAME

(71) Applicant: Hitachi Automotive Systems, Ltd., Hitachinaka (JP)

(72) Inventors: Wataru Hatsuse, Tokyo (JP); Masaki Koyama, Tokyo (JP); Shuhei Nagata, Tokyo (JP); Takahiro Suzuki, Tokyo (JP)

(73) Assignee: HITACHI ASTEMO, LTD., Hitachinaki (JP)

( * ) Notice: Subject to any disclaimer, the term of this patent is extended or adjusted under 35 U.S.C. 154(b) by 0 days.

(21) Appl. No.: 16/339,468

(22) PCT Filed: Sep. 29, 2017

(86) PCT No.: PCT/JP2017/035475
§ 371 (c)(1),
(2) Date: Apr. 4, 2019

(87) PCT Pub. No.: WO2018/070270
PCT Pub. Date: Apr. 19, 2018

(65) Prior Publication Data
US 2019/0238066 A1    Aug. 1, 2019

(30) Foreign Application Priority Data

Oct. 12, 2016    (JP) .............................. JP2016-200529

(51) Int. Cl.
*H02M 7/5387* (2007.01)
*H02M 7/5388* (2007.01)
*H02M 1/00* (2006.01)

(52) U.S. Cl.
CPC ..... *H02M 7/53871* (2013.01); *H02M 7/5387* (2013.01); *H02M 7/5388* (2013.01); *H02M 1/0054* (2021.05)

(58) Field of Classification Search
CPC ...... H02M 7/217; H02M 7/219; H02M 7/521; H02M 7/5387; H02M 7/53871;
(Continued)

(56) References Cited

U.S. PATENT DOCUMENTS 5,021,936 A    6/1991 Nishizawa
5,749,226 A *  5/1998 Bowman ............... F02G 1/0435
                                                                257/E23.096
(Continued)

FOREIGN PATENT DOCUMENTS

CN    204464968 U    7/2015
CN    105048891 A    11/2015
(Continued)

OTHER PUBLICATIONS

International Search Report with English translation and Written Opinion issued in corresponding application No. PCT/JP2017/035475 dated Dec. 19, 2017.
(Continued)

*Primary Examiner* — Thienvu V Tran
*Assistant Examiner* — Ivan Laboy
(74) *Attorney, Agent, or Firm* — Foley & Lardner LLP

(57) ABSTRACT

Provided are a power conversion device and a system using the same, which can reduce loss of each semiconductor element in a power conversion circuit and enable high efficiency of a device controlled by the power conversion device. The power conversion device includes a direct current (DC) power source; and a full-bridge circuit having first upper and lower arms having an upper element and a lower element and second upper and lower arms having an upper element and a lower element, in which the first upper and lower arms and the second upper and lower arms are electrically connectable to a device, and ON resistances of the upper element of the first upper and lower arms and the
(Continued)

lower element of the second upper and lower arms are smaller than ON resistances of the lower element of the first upper and lower arms and the upper element of the second upper and lower arms.

4 Claims, 5 Drawing Sheets

(58) Field of Classification Search
CPC ....... H02M 7/5388; H02M 2001/0048; H02M 2001/0054; H02M 2007/53878; Y02B 70/1491; H02P 25/092
See application file for complete search history.

(56) References Cited

U.S. PATENT DOCUMENTS

| | | | | |
|---|---|---|---|---|
| 6,175,199 B1* | 1/2001 | Moskowitz | ........ | H05B 41/2928 |
| | | | | 315/291 |
| 2004/0052125 A1* | 3/2004 | Tankard | ................ | H02P 25/092 |
| | | | | 365/200 |
| 2007/0047612 A1* | 3/2007 | Keough | ................. | H05B 6/067 |
| | | | | 373/52 |
| 2007/0107708 A1* | 5/2007 | Uchiyama | .............. | F02M 26/54 |
| | | | | 123/568.18 |
| 2011/0061411 A1* | 3/2011 | Kim | ...................... | F04B 35/045 |
| | | | | 62/132 |
| 2011/0285362 A1* | 11/2011 | Huomo | ............... | H02M 1/4208 |
| | | | | 323/205 |

FOREIGN PATENT DOCUMENTS

| | | |
|---|---|---|
| JP | S63-262062 A | 10/1988 |
| JP | H1-097173 A | 4/1989 |
| JP | H4-150794 A | 5/1992 |
| JP | 2001-073944 A | 3/2001 |
| JP | 2006-060985 A | 3/2006 |
| JP | 2008-237016 A | 10/2008 |

OTHER PUBLICATIONS

Office Action issued in corresponding Chinese Patent Application No. 201780062630.3 dated Jun. 22, 2020, with English machine translation.

* cited by examiner

POWER CONVERSION DEVICE AND SYSTEM USING THE SAME

TECHNICAL FIELD

The present invention relates to a power conversion device and a system using the same.

BACKGROUND ART

A method of controlling a compressor using a power conversion device is known. The power conversion device can have a plurality of semiconductor elements, and a configuration for increasing efficiency of the power conversion device by using two or more types of elements has been proposed.

PTL1 discloses a main circuit of an inverter including a configuration in which two high-speed switching elements are connected in series with each other in one set of two sets of upper and lower arms, and two low-speed switching elements are connected in series with each other in another set.

CITATION LIST

Patent Literature

PTL 1: JP S63-262062 A

SUMMARY OF INVENTION

Technical Problem

However, PTL1 does not consider at all a reduction of loss occurring in each semiconductor element by making resistance characteristics of each semiconductor element suitable in consideration of load characteristics of a device controlled by a power conversion device.

An object of the present invention is to provide a power conversion device and a system using the same, which can reduce loss of each semiconductor element in a power conversion circuit and enable high efficiency of a device controlled by the power conversion device.

Solution to Problem

A power conversion device provided according to the preferred mode of the invention includes a direct current (DC) power source, and a full-bridge circuit having first upper and lower arms having an upper element and a lower element and second upper and lower arms having an upper element and a lower element, in which the first upper and lower arms and the second upper and lower arms are electrically connectable to a device, and ON resistances of the upper element of the first upper and lower arms and the lower element of the second upper and lower arms are smaller than ON resistances of the lower element of the first upper and lower arms and the upper element of the second upper and lower arms.

A system using a power conversion device provided according to another preferred mode of the invention includes the power conversion device including a direct current (DC) power source, and a full-bridge circuit having first upper and lower arms having an upper element and a lower element and second upper and lower arms having an upper element and a lower element, in which the first upper and lower arms and the second upper and lower arms are electrically connectable to a device, and ON resistances of the upper element of the first upper and lower arms and the lower element of the second upper and lower arms are smaller than ON resistances of the lower element of the first upper and lower arms and the upper element of the second upper and lower arms, and a device electrically connected to the first upper and lower arms and the second upper and lower arms of the power conversion device, in which the device responds with a first load in a state in which the upper element of the first upper and lower arms and the lower element of the second upper and lower arms are turned on, and responds with a second load which is smaller than the first load in a state in which the lower element of the first upper and lower arms and the upper element of the second upper and lower arms are turned on.

Advantageous Effects of Invention

According to the present invention, it is possible to provide the power conversion device and the system using the same, which can reduce the loss of each semiconductor element in the power conversion circuit and enable high efficiency of the device controlled by the power conversion device.

The problems, structures, and effects other than those described above are apparent from the description of the following embodiments.

DESCRIPTION OF EMBODIMENTS

Figure 1:
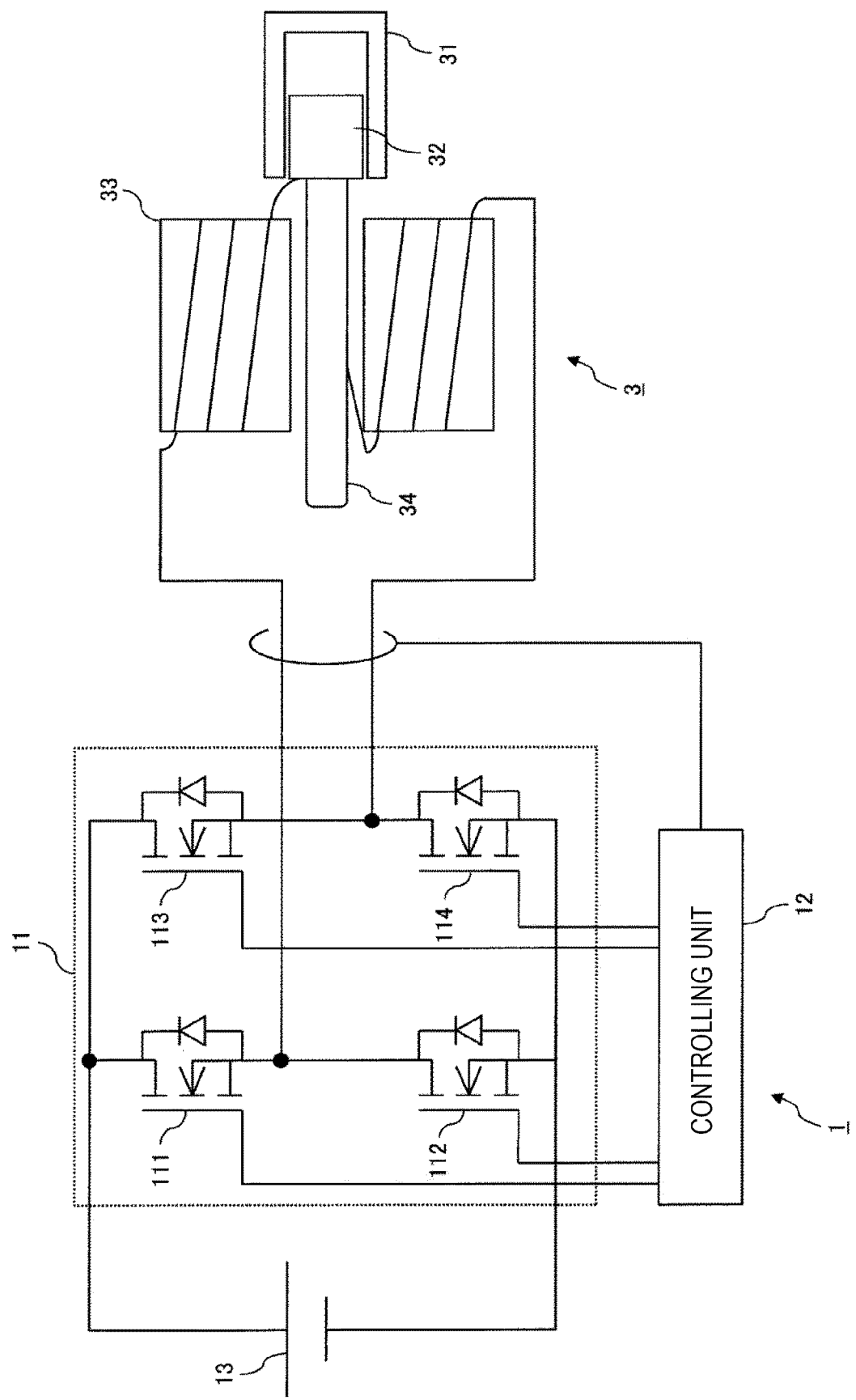
FIG. 1 is an overall schematic configuration diagram of a system including a power conversion device and a compressor of Embodiment 1 according to an embodiment of the present invention.

Embodiments of the present invention will be hereinafter described in detail with reference to the accompanying drawings. The same components are denoted by the same reference numerals, and a redundant explanation will be omitted.

In addition, in the following, a compressor will be described as an example of a device that is electrically connected to a power conversion device that constitutes a system.

Embodiment 1

[Power Conversion Device 1 and Compressor 3]

FIG. 1 is an overall schematic configuration diagram of a system including a power conversion device 1 and a compressor 3 of Embodiment 1 according to an embodiment of the present invention. As shown in FIG. 1, the compressor 3 is a device that uses a linear motor as a driving source. The linear motor and the compressor 3 are each electrically connected to the power conversion device 1 and are an example of a system using the power conversion device 1.

The power conversion device 1 includes a power conversion circuit 11, a controlling unit 12, and a direct current (DC) power source 13.

The compressor 3 includes a bottomed cylindrical cylinder 31, a piston 32 slidable on an inner side surface of the cylinder 31 and capable of changing an inner volume surrounded by the cylinder 31 and its own surface (a tip end surface) opposite to a bottom surface of the cylinder 31, a winding 33 wound around a magnetic body, and a movable element 34 having one end connected to the piston 32. Further, the linear motor is constituted by the winding 33 wound around the magnetic body and the movable element 34 having one end connected to the piston 32, and the movable element 34 is provided with a permanent magnet (not shown).

The power conversion circuit 11 converts DC power supplied from the DC power source 13 to alternating current (AC) power and outputs the AC power to the compressor 3. The power conversion circuit 11 has a single phase and two sets of upper and lower arms in which two semiconductor elements are connected in series with each other. More specifically, first upper and lower arms in which a semiconductor element 111 and a semiconductor element 112 are connected in series with each other and second upper and lower arms in which a semiconductor element 113 and a semiconductor element 114 are connected in series with each other are connected in parallel to each other to form a full-bridge circuit.

In addition, the semiconductor element 111 and the semiconductor element 113 are connected to a positive side of the DC power source 13, and the semiconductor element 112 and the semiconductor element 114 are connected to a negative side of the DC power source 13. One end of the winding 33 of the compressor 3 is connected to a wiring (between the semiconductor element 111 and the semiconductor element 112) connecting the semiconductor element 111 and the semiconductor element 112, and the other end of the winding 33 of the compressor 3 is connected to a wiring (between the semiconductor element 113, and the semiconductor element 114) connecting the semiconductor element 113 and the semiconductor element 114. Further, the semiconductor element connected to the positive side of the DC power source 13 is referred to as an upper element and the semiconductor element connected to the negative side thereof is also referred to as a lower element.

The controlling unit 12 controls the power conversion circuit 11 based on a motor current flowing through the winding 33.

The power conversion circuit 11 outputs the AC power to the winding 33.

The movable element 34 has at least one permanent magnet, and receives the output of the power conversion circuit 11 to perform a reciprocating motion in accordance with an AC magnetic flux generated by the winding 33. In accordance with the reciprocating motion of the movable element 34, the piston 32 performs the reciprocating motion and the inner volume of the cylinder 31 increases or decreases. The cylinder 31 has a valve (not shown) capable of making fluid (working fluid) enter and exit into and from the inner volume part. For the cylinder 31, the piston 32, and the valve (not shown), various known objects can be used. Hereinafter, a case of using a gas refrigerant as the fluid (working fluid) will be described as an example.

Figure 2:
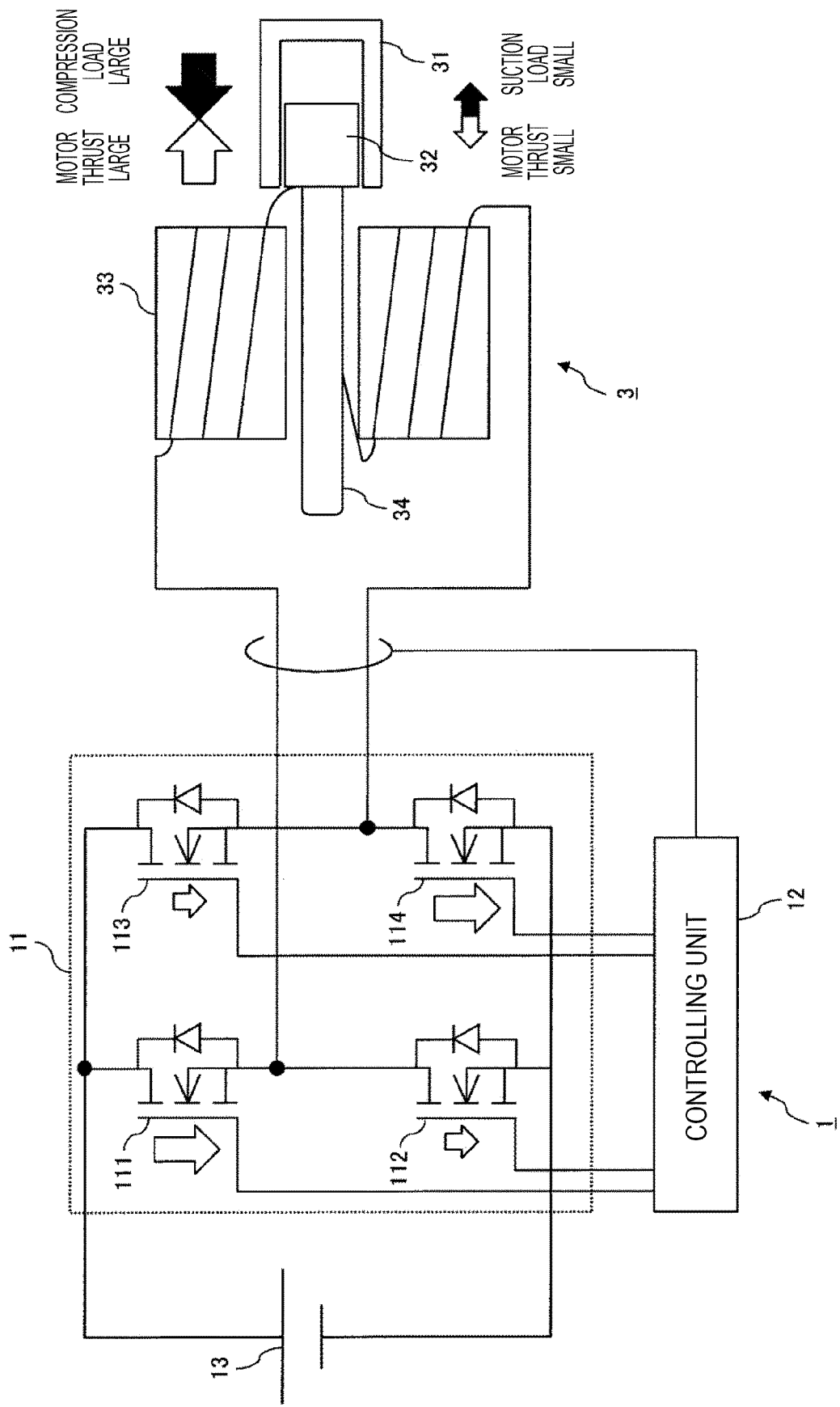
FIG. 2 is a schematic diagram illustrating a relationship between a current flowing through the power conversion device and the compressor, which constitute the system shown in FIG. 1, and a load on the compressor in accordance with a compression of a working fluid.

FIG. 2 is a schematic diagram illustrating a relationship between a current flowing through the power conversion device 1 and the compressor 3, which constitute the system shown in FIG. 1, and a load on the compressor 3 in accordance with a compression of a fluid (working fluid). When the compressor 3 is driven, the gas refrigerant, which is the fluid (working fluid), compresses or expands in accordance with the reciprocating motion of the piston 32. A workload (load) required for compressing or expanding the gas refrigerant, which is the fluid (working fluid), is different, and a compression load (a first load) is generally greater than the expansion (suction) load (a second load). That is, since a thrust of the linear motor required for compression is greater than the thrust of the linear motor required for expansion (suction), it is preferable that the motor current at the time of compression is greater than the motor current at the time of expansion (suction). Hereinafter, a direction of a current flowing when the thrust of the linear motor at the time of compression is obtained is referred to as a positive direction and a direction of a current flowing when the thrust of the linear motor at the expansion (suction) is obtained is referred to as a negative direction. Further, the first load (compression load) and the second load (expansion load) do not have to be constant throughout the time of generation of these loads, and for example, as a time average value of one cycle, the first load (compression load) may be greater than the second load (expansion load).

In the power conversion circuit 11 (full-bridge circuit), which is the single phase, the direction of the current flowing through the winding 33 wound around the magnetic body can be switched by switching an ON/OFF state of semiconductor elements that are diagonally opposite to each other (located diagonally to each other). In this embodiment, the current flowing through the winding 33 is assumed to be the positive direction by turning on the two semiconductor elements (the semiconductor element 111 (the upper element of the first upper and lower arms) and the semiconductor element 114 (the lower element of the second upper and lower arms)) that are diagonally opposite to each other (located diagonally to each other), and turning off the remaining semiconductor elements (the semiconductor element 112 (the lower element of the first upper and lower arms) and the semiconductor element 113 (the upper element of the second upper and lower arms)), among the semiconductor elements 111 to 114 of the power conversion circuit 11. In addition, the current flowing through the winding 33 is assumed to be the negative direction by turning on the two semiconductor elements (the semiconductor element 112 (the lower element of the first upper and lower arms) and the semiconductor element 113 (the upper element of the second upper and lower arms)) that are diagonally opposite to each other (located diagonally to each other), and turning off the remaining semiconductor elements (the semiconductor element 111 (the upper element of the first upper and lower arms) and the semiconductor element 114 (the lower element of the second upper and lower arms)).

Considering that the compression load (first load) is greater than the expansion load (second load), by setting an ON time ratio of the semiconductor element 111 (the upper element of the first upper and lower arms) and the semiconductor element 114 (the lower element of the second upper and lower arms) to be greater than an ON time ratio of the semiconductor element 112 (the lower element of the first upper and lower arms) and the semiconductor element 113 (the upper element of the second upper and lower arms), it is preferable that the motor current flowing through the semiconductor element 111 (the upper element of the first upper and lower arms) and the semiconductor element 114 (the lower element of the second upper and lower arms) is set to be greater than the motor current flowing through the semiconductor element 112 (the lower element of the first upper and lower arms) and the semiconductor element 113 (the upper element of the second upper and lower arms). In this way, the current is concentrated on the semiconductor element 111 (the upper element of the first upper and lower arms) and the semiconductor element 114 (the lower element of the second upper and lower arms), such that an amount of current flowing through the semiconductor element 112 (the lower element of the first upper and lower arms) and the semiconductor element 113 (the upper element of the second upper and lower arms) becomes a small value (in FIG. 2, a level of the motor current is shown by a size of an outlined arrow). In this embodiment as described above, for the power conversion device 1 including the power conversion circuit 11 of the single phase connected to a device having a different amount of current suitable for the positive direction and the negative direction, respectively, the current is concentrated on the semiconductor elements that are diagonally opposite to each other (located diagonally each other).

[Characteristics of Semiconductor Element]

Figure 3:
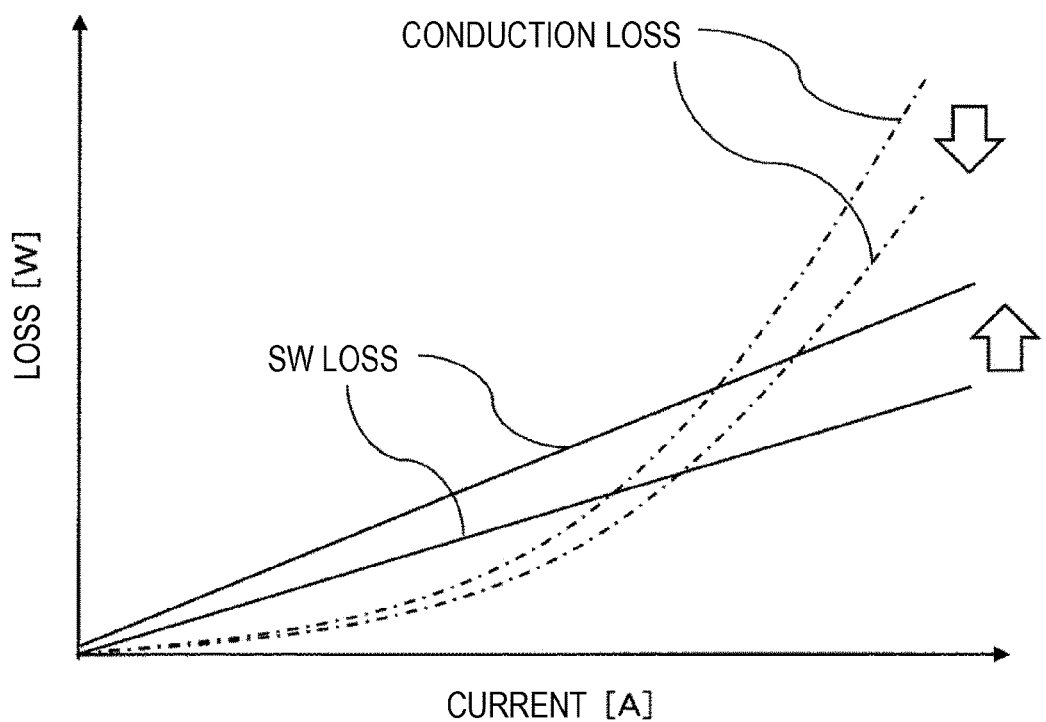
FIG. 3 is a diagram showing schematic characteristics for a current of a switching loss and a conduction loss of an MOS type element.

FIG. 3 is a diagram showing schematic characteristics for a current of each of the switching loss and the conduction loss of a metal-oxide-semiconductor (MOS) type element which is a type of semiconductor element. The switching loss (SW loss) shown by a solid line is a loss caused by the switching of the semiconductor element, and has a substantially linear relationship with respect to the motor current. The conduction loss shown by one-dot chain line is a loss caused by resistance (ON resistance) at the time of electric conduction of the semiconductor element and has a relationship which is proportional to a square of the motor current.

It is known that the MOS type element has a trade-off relationship between a reduction in the switching loss (SW loss) and a reduction in the conduction loss. In order to reduce the ON resistance of the MOS type element (to reduce a coefficient multiplying the square of the current), it is required to increase a chip size, but in this way, an amount of charges flowing through the MOS type element increases, resulting in an increase in the switching loss (SW loss).

Figure 4:
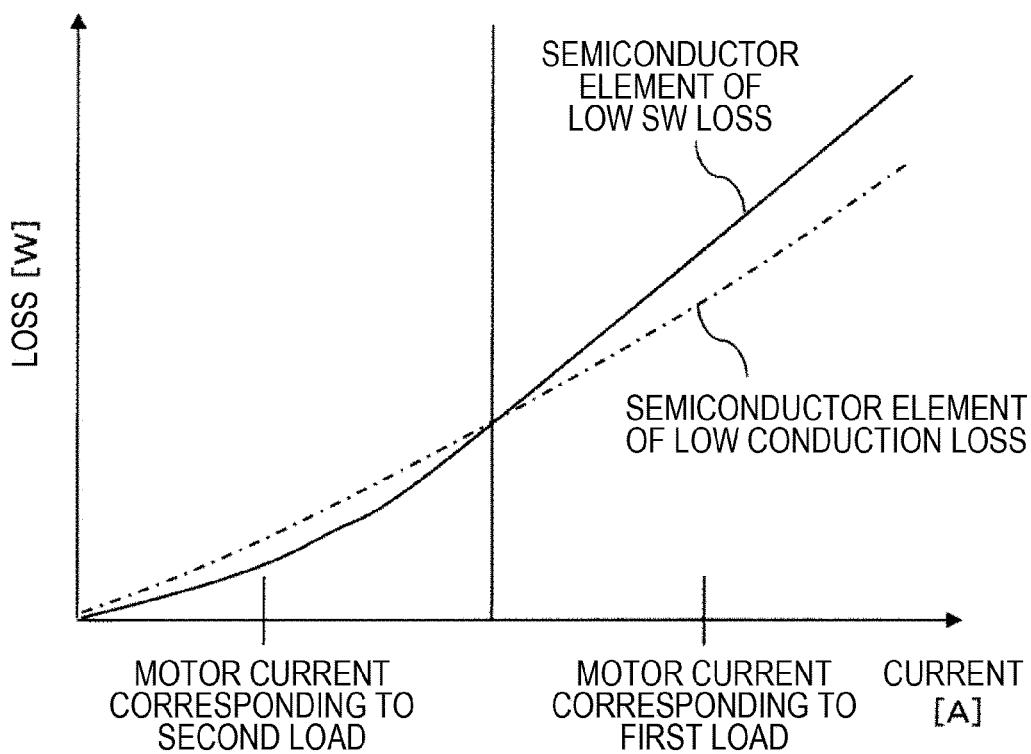
FIG. 4 is a diagram showing schematic characteristics for a current of an overall loss of the MOS type element.

FIG. 4 is a diagram showing schematic characteristics for a current of an overall loss obtained by summing the switching loss (SW loss) and the conduction loss of the MOS type element. In FIG. 4, among the MOS type elements, a semiconductor element of a low SW loss is shown by a solid line, and a semiconductor element of a low conduction loss is shown by one-dot chain line. In a region in which the current is small (a region in which the motor current corresponding to the second load (expansion load) exists), the overall loss of the semiconductor elements of the low SW loss is small, and in a region in which the current is large (a region in which the motor current corresponding to the first load (compression load) exists), the overall loss of the semiconductor elements of the low conduction loss is small. Further, a graph shape illustrated in FIG. 4 is usually kept qualitatively even if the ON/OFF ratio of the element is changed. For this reason, it is possible to reduce the overall loss of the entire power conversion circuit 11 by applying a semiconductor element of a type that has a lower conduction loss (lower ON resistance) than the semiconductor element 112 (the lower element of the first upper and lower arms) and the semiconductor element 113 (the upper element of the second upper and lower arms) to the semiconductor element 111 (the upper element of the first upper and lower arms) and the semiconductor element 114 (the lower element of the second upper and lower arms) in which the concentration of the current occurs, and applying a semiconductor element that has a lower SW loss than the semiconductor element 111 (the upper element of the first upper and lower arms) and the semiconductor element 114 (the lower element of the second upper and lower arms) to the semiconductor element 112 (the lower element of the first upper and lower arms) and the semiconductor element 113 (the upper element of the second upper and lower arms) in which the concentration of the current does not occur. Further, an ON resistance value or a SW loss value of the semiconductor element also depends on a thickness of the semiconductor element or a chip area.

More specifically, it is more preferable to select a combination of types of the semiconductor elements so that the overall loss of the semiconductor element 111 (the upper element of the first upper and lower arms) and the semiconductor element 114 (the lower element of the second upper and lower arms) is smaller than that of the semiconductor element 112 (the lower element of the first upper and lower arms) and the semiconductor element 113 (the upper element of the second upper and lower arms) in an amount of current required for generating the thrust of the linear motor corresponding to the first load (compression load), and is greater than that of the semiconductor element 111 (the upper element of the first upper and lower arms) and the semiconductor element 114 (the lower element of the second upper and lower arms) in an amount of current required for generating the thrust of the linear motor corresponding to the second load (expansion load).

Further, for the compressor 3, the first load (compression load) and the second load (expansion load) may be considered as the compression load and the expansion load in a steady state, respectively. Here, the steady state is, for example, a state in which a flow rate of the gas refrigerant entering and exiting a compression interior is maintained to be substantially constant for 5 seconds or more.

As described above, according to this embodiment, it is possible to provide the power conversion device and the system using the same, which can reduce the loss of each semiconductor element in the power conversion circuit and enable high efficiency of the device controlled by the power conversion device.

In addition, specifically, by using the power conversion device 1 of this embodiment, the loss of each semiconductor element can be suppressed, and it is possible to drive the single-phase driving compressor 3 with high efficiency.

Embodiment 2

The configuration of Embodiment 2 is the same as that of Embodiment 1 except for the following points. In this embodiment, the power conversion device 1 has the MOS type element and an insulated gate bipolar transistor (IGBT) type element. More specifically, instead of the MOS type semiconductor element 111 (the upper element of the first upper and lower arms) and the semiconductor element 114 (the lower element of the second upper and lower arms) that are turned on when the current of the positive direction flows, an IGBT type semiconductor element 115 (the upper element of the first upper and lower arms) and an IGBT type semiconductor element 116 (the lower element of the second upper and lower arms) are used.

Figure 5:
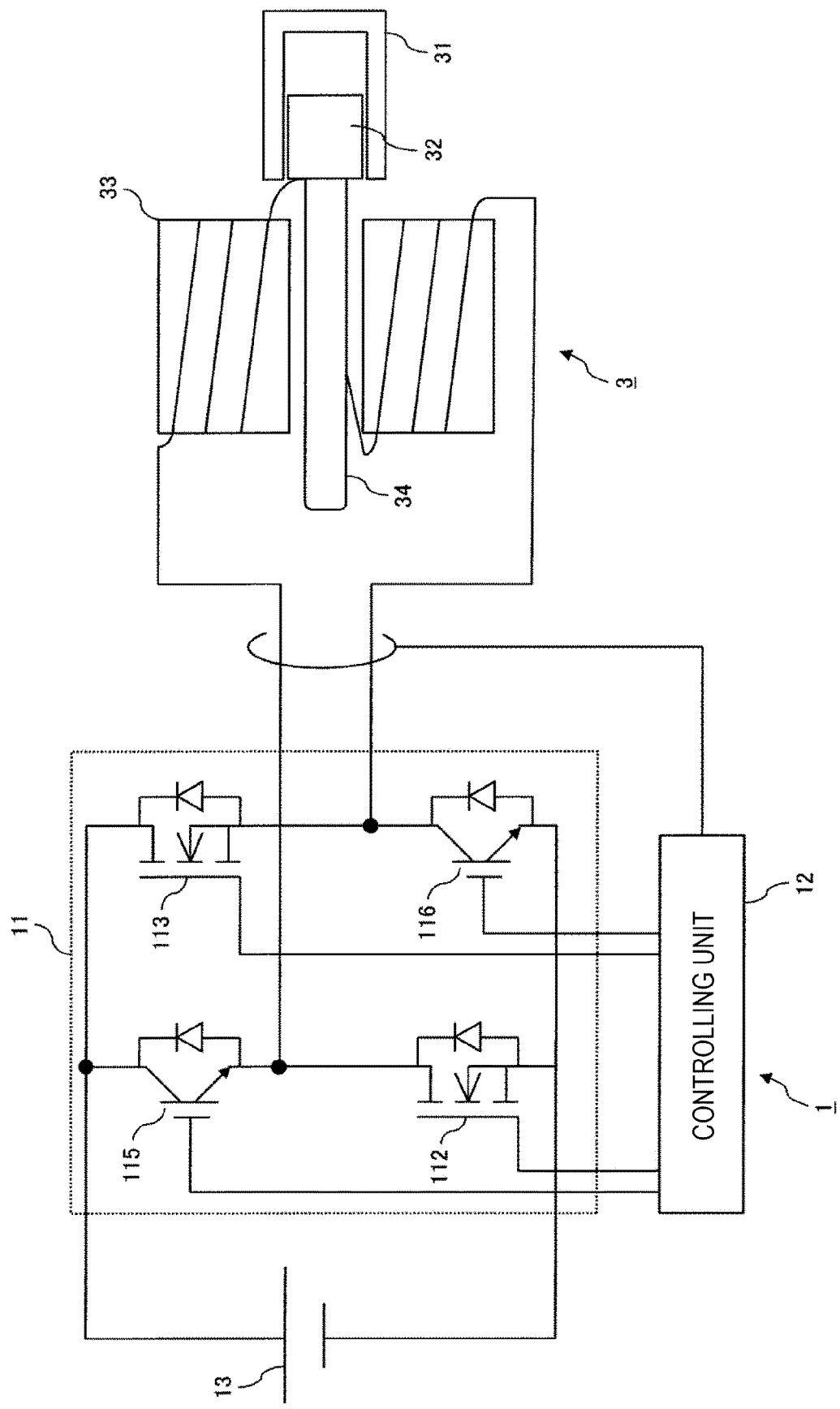
FIG. 5 is an overall schematic configuration diagram of a system including a power conversion device and a compressor of Embodiment 2 according to another embodiment of the present invention.
Figure 6:
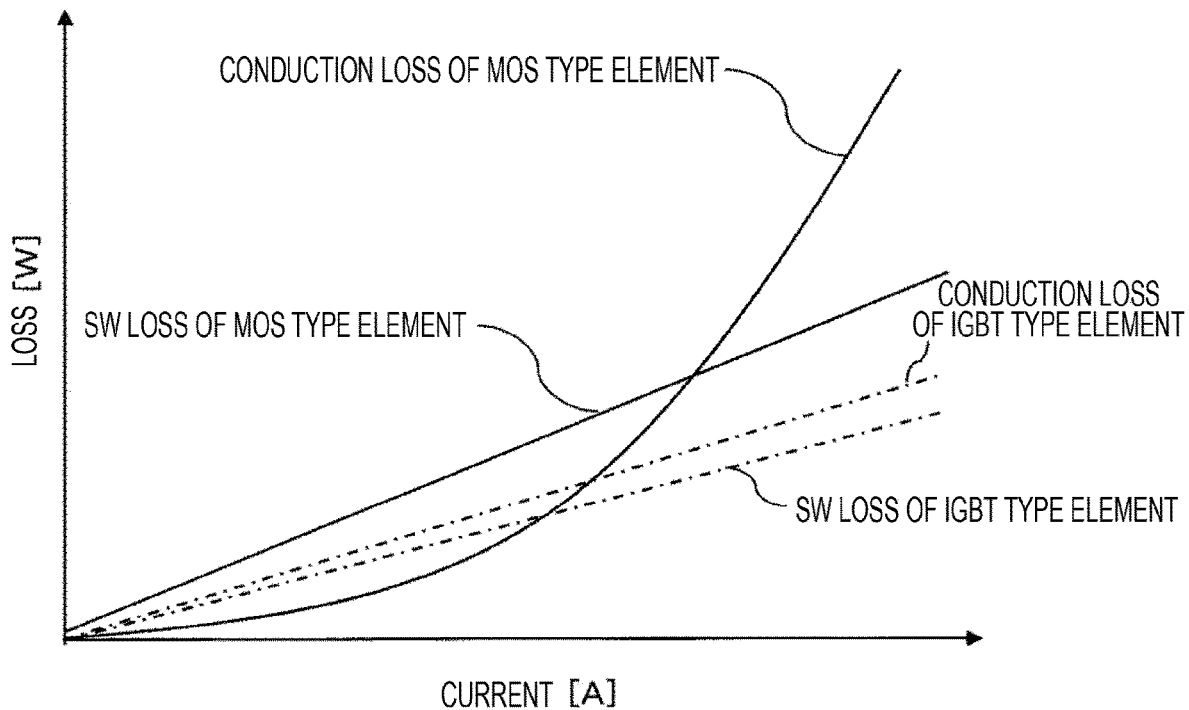
FIG. 6 is a diagram showing schematic characteristics for a current of a switching loss and a conduction loss of the MOS type element and the IGBT element.

FIG. 5 is an overall schematic configuration diagram of a system including the power conversion device 1 and the compressor 3 of this embodiment and FIG. 6 is a diagram showing schematic characteristics for a current of a switching loss and a conduction loss of the MOS type element and the IGBT type element.

As shown in FIG. 6, the MOS type element indicated by a solid line has the switching loss (SW loss) which is a substantially linear relationship with the motor current, and the conduction loss having the relationship that is proportional to the square of the motor current. In the IGBT type element indicated by one-dot chain line, since the switching loss (SW loss) occurs by the same principle as the MOS type element, the IGBT type element has a substantially linear relationship with respect to the motor current. However, since the conduction loss is a loss caused by a forward voltage due to a diode, the IGBT type element has a substantially linear relationship with respect to the motor current unlike the case of the MOS type element.

Figure 7:
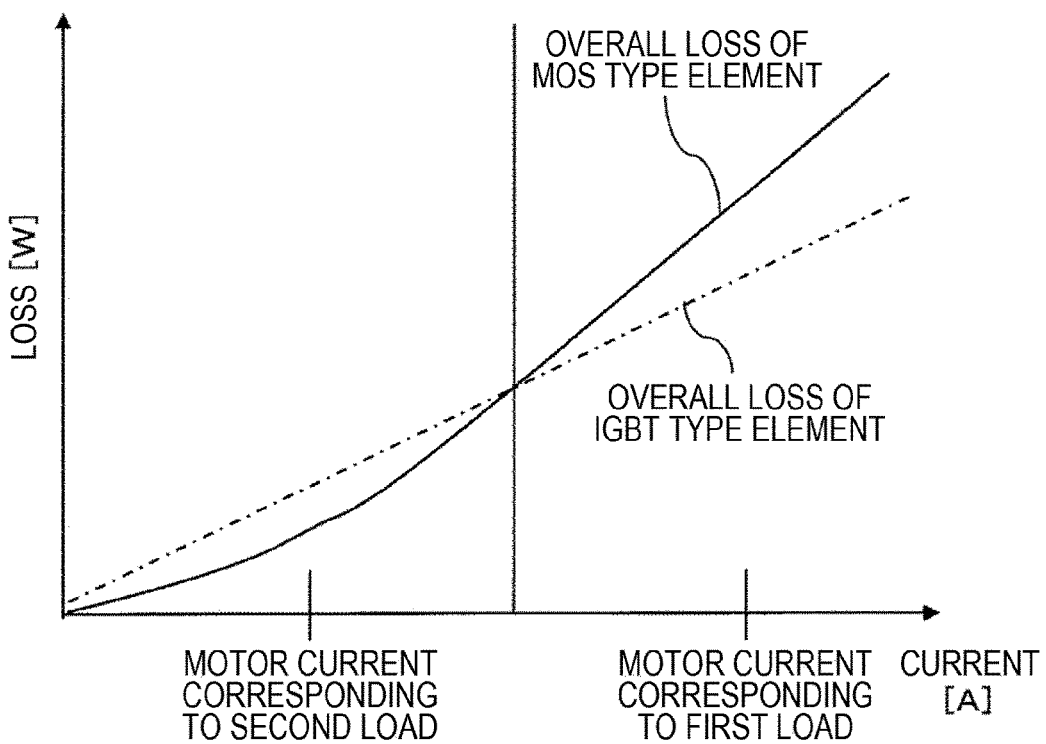
FIG. 7 is a diagram showing schematic characteristics for a current of the MOS type element and the IGBT element.

FIG. 7 is a diagram showing schematic characteristics for a current of an overall loss obtained by summing the switching loss (SW loss) and the conduction loss of the MOS type element and the IGBT type element, respectively. As shown in FIG. 7, in a region in which the current is small (a region in which the motor current corresponding to the second load (expansion load) exists), the overall loss of the MOS type semiconductor elements indicated by a solid line is smaller than the overall loss of the IGBT type elements indicated by one-dot chain line. Meanwhile, in a region in which the current is large (a region in which the motor current corresponding to the first load (compression load) exists), the overall loss of the IGBT type elements indicated by one-dot chain line is smaller than the overall loss of the MOS type elements indicated by the solid line.

For this reason, in this embodiment, as shown in FIG. 5, as the semiconductor elements of the power conversion circuit 11, the IGBT type elements are applied to the semiconductor element 115 (the upper element of the first upper and lower arms) and the semiconductor element 116 (the lower element of the second upper and lower arms) in which the concentration of the current occurs, and the MOS type elements are applied to the semiconductor element 112 (the lower element of the first upper and lower arms) and the semiconductor element 113 (the upper element of the second upper and lower arms) in which the concentration of the current does not occur. By doing so, it is possible to reduce the overall loss. Further, instead of the IGBT type elements, other elements in which the conduction loss occurs by the forward voltage due to the diode may be used.

As described above, according to this embodiment, it is possible to provide the power conversion device and the system using the same, which can reduce the loss of each semiconductor element in the power conversion circuit and enable high efficiency of the device controlled by the power conversion device.

In addition, specifically, by using the power conversion device 1 of this embodiment, the loss of each semiconductor element can be suppressed, and it is possible to drive the single-phase driving compressor 3 with high efficiency.

Further, the system including the power conversion device 1 and the compressor 3 according to Embodiment 1 or Embodiment described above can be applied to a compressor for pressure-feeding a refrigerant in an air conditioner including a heat exchanger functioning as a condenser or an evaporator.

In addition, the system including the power conversion device 1 and the compressor 3 according to Embodiment 1 or Embodiment 2 can be applied to a compressor for compressing a working fluid to adjust a vehicle height in an air suspension.

Furthermore, the system including the power conversion device 1 and the compressor 3 according to Embodiment 1 or Embodiment 2 can also be applied to a compressor for pressure-feeding a liquid refrigerant in a refrigerator having a condenser and an evaporator.

Further, in Embodiment 1 and Embodiment 2 described above, although the compressor 3 has been described as an example of the device that is electrically connected to the power conversion device 1 that constitutes the system, the device is not limited thereto. As the device that is electrically connected to the power conversion device 1 shown in Embodiment 1 and Embodiment 2 described above, a device that changes a load in a running state or operating state, in particular, a device that controls a gas phase, a liquid phase, a gas-liquid mixed phase, a fluid having viscosity, and the like is applicable in the same manner.

The present invention is not limited to the above-described embodiments, and various modifications can be made within a range not contrary to the technical spirit of the present application. For example, the embodiments described above have been described in detail in order to explain the present invention in detail, and are not necessarily limited to those having all the configurations described above. In addition, it is possible to add, delete, and replace known configurations on some of the configurations of the embodiment.

REFERENCE SIGNS LIST 1 power conversion device
11 power conversion circuit (full-bridge circuit)
111 to 116 semiconductor element
12 controlling unit
13 DC power source
3 compressor
31 cylinder
32 piston
33 winding
34 movable element

The invention claimed is:
1. A system comprising:
  a compressor comprising:
    a piston configured to compress and expand a fluid by a reciprocating motion, and
    a winding which is electrically connected to a power conversion device; and
  the power conversion device connected to the compressor, comprising:
    a direct current (DC) power source; a full-bridge circuit having first upper and lower arms having an upper element and a lower element and second upper and lower arms having an upper element and a lower element,
      wherein the first upper and lower arms and the second upper and lower arms are electrically connected to the compressor, and
      ON resistances of the upper element of the first upper and lower arms and the lower element of the second upper and lower arms are smaller than ON resistances of the lower element of the first upper and lower arms and the upper element of the second upper and lower arms; and a controller configured to set a first current flowing through the upper element of the first upper and lower arms and the lower element of the second upper and lower arms during a first time period to be higher than a second current flowing through the lower element of the first upper and lower arms and the upper element of the second upper and lower arms during a second time period by setting an ON time ratio of the upper element of the first upper and lower arms and the lower element of the second upper and lower arms to be higher than an ON time ratio of the lower element of the first upper and lower arms and the upper element of the second upper and lower arms, cause the compressor to compress the fluid with the first current during the first time period, and cause the compressor to expand the fluid with the second current during the second time period, wherein the compressor is configured to:

respond with a first load and compress the fluid in a state in which the upper element of the first upper and lower arms and the lower element of the second upper and lower arms are turned on, and respond with a second load which is smaller than the first load and expand the fluid in a state in which the lower element of the first upper and lower arms and the upper element of the second upper and lower arms are turned on.

2. The power conversion device according to claim 1, wherein switching losses of the lower element of the first upper and lower arms and the upper element of the second upper and lower arms are smaller than switching losses of the upper element of the first upper and lower arms and the lower element of the second upper and lower arms.

3. The power conversion device according to claim 1, wherein the lower element of the first upper and lower arms and the upper element of the second upper and lower arms are metal-oxide-semiconductor (MOS) type elements, and the upper element of the first upper and lower arms and the lower element of the second upper and lower arms are elements in which conduction loss occurs by a forward voltage due to a diode.

4. The power conversion device according to claim 2, wherein the lower element of the first upper and lower arms and the upper element of the second upper and lower arms are metal-oxide-semiconductor (MOS) type elements, and the upper element of the first upper and lower arms and the lower element of the second upper and lower arms are elements in which conduction loss occurs by a forward voltage due to a diode.

\* \* \* \* \*